UNITED STATES PATENT OFFICE.

OSKAR SPENGLER AND ALFRED THURM, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY.

MANUFACTURE OF CONDENSATION PRODUCTS CONTAINING SULPHUR.

No Drawing. Application filed May 3, 1926, Serial No. 106,551, and in Germany May 28, 1925.

This invention relates to an improvement in or a modification of that described in specification to U. S. Letters Patent 1,550,589. By the invention therein described condensation products containing sulphur are made by heating an arylsulphochloride with an hydroxyaryl-compound.

According to the present invention similar condensation products are obtained by causing a sulphochloride of an hydroxyarylcarboxylic acid to act upon an esterified hydroxyaryl-compound. By this process there may be obtained, among other condensation products, those which are obtainable by the invention of the said specification with the advantage that the products of the present invention are only slightly hygroscopic.

The following examples illustrate the invention, the parts being by weight:

*Example 1.*—4 parts of salicylic acid sulphochloride of the formula

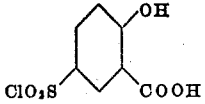

are fused with 1 part of di-(2-chlorphenyl)-carbonate of the formula

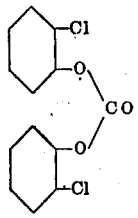

The reaction begins at about 170° C. accompanied by much foaming. The temperature is gradually raised to 190–195° C. while stirring, until a test portion is smoothly soluble in water. The dark-coloured mass, which is brittle when cold, dissolves easily in water. The nearly colourless solution has an acid reaction and a slightly milky turbidity. It converts animal skin into a full white leather.

*Example 2.*—5 parts of salicylic acid sulphochloride and 1 part of 1.3-dihydroxybenzene diacetate are fused together. At a bath temperature above 160° C. elimination of acetic acid and hydrochloric acid begins. On further heating the mass becomes thick, so that it can be further worked only with difficulty. At a bath temperature of 190–195° C. the mass is soluble in water. The cooled, brittle mass is pulverized. The yellow-brown powder dissolves in water to a clear deep brown solution which converts animal skin into a brown full leather.

*Example 3.*—5 parts of salicylic acid sulphochloride are melted with 2 parts of 1.2.4-trihydroxybenzenetriacetate at 170–175° C. until a sample dissolves clearly in water. The mass, which is yellow-brown, tough and capable of being drawn into threads while hot, is brittle when cold so that it can be pulverized easily. Its aqueous solution is brown and yields a brown leather.

*Example 4.*—A mixture of 3 parts of salicylic acid sulphochloride and 1 part of acetylsalicylic acid of the formula

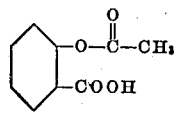

is gradually heated to a bath temperature of 175–180° C. until a sample dissolves clearly in water. The condensation product which, in the form of powder is yellowish brown and only slightly hygroscopic, dissolves in water to a nearly colourless solution which converts animal skin into a greenish-yellow leather.

*Example 5.*—15 parts of salicylic acid sulphochloride and 7 parts of polysalicylide of the formula

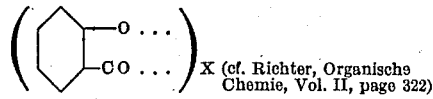

are fused together at 165–170° C. until solubility in water to a colourless solution which converts calf skin into a full white leather.

It is obvious to those skilled in the art that our present invention is not limited to the foregoing examples or to the details given therein. For instance in the foregoing examples other hydroxyarylcarboxylic acid sulphochlorides can be substituted for salicylic acid sulphochloride.

What we claim is,—
1. Manufacture of condensation products containing sulphur being tanning materials forming in the dry puverized shape only slightly hygroscopic powders, dissolving in water, being obtained by reaction between an hydroxyaryl-carboxylic acid sulphochloride and an esterified hydroxyaryl compound.

2. Manufacture of condensation products containing sulphur being tanning materials forming in the dry pulverized shape only slightly hygroscopic powders, dissolving in water, being obtained by reaction between an hydroxyarylcarboxylic acid sulphochloride and an esterified hydroxybenzene compound.

3. Manufacture of condensation products containing sulphur being tanning materials forming in the dry pulverized shape only slightly hygroscopic powders, dissolving in water, being obtained by reaction between an hydroxyaryl carboxylic acid sulphochloride and an acetylated hydroxybenzene compound.

4. Manufacture of condensation products containing sulphur being tanning materials forming in the dry pulverized shape only slightly hygroscopic powders, dissolving in water, being obtained by reaction between salicylic acid sulphochloride and an acetylated hydroxybenzene compound.

5. Manufacture of a condensation product containing sulphur being a tanning material forming in the dry pulverized shape an only slightly hygroscopic powder, dissolving in water, being obtained by reaction between salicylic acid sulphochloride and acetylsalicylic acid.

In testimony whereof we affix our signatures.

OSKAR SPENGLER.
ALFRED THURM.